US010816516B2

(12) United States Patent
Tolley et al.

(10) Patent No.: US 10,816,516 B2
(45) Date of Patent: Oct. 27, 2020

(54) AUTOSAMPLERS AND GAS CHROMATOGRAPHIC SYSTEMS AND METHODS INCLUDING SAME

(71) Applicant: PerkinElmer Health Sciences, Inc., Waltham, MA (US)

(72) Inventors: Samuel Tolley, Hamden, CT (US); Andrew Tipler, Trumbull, CT (US)

(73) Assignee: PerkinElmer Health Sciences, Inc., Waltham, MA (US)

( * ) Notice: Subject to any disclaimer, the term of this patent is extended or adjusted under 35 U.S.C. 154(b) by 354 days.

(21) Appl. No.: 15/937,959

(22) Filed: Mar. 28, 2018

(65) Prior Publication Data

US 2019/0302068 A1     Oct. 3, 2019

(51) Int. Cl.
*G01N 35/02*     (2006.01)
*G01N 35/00*     (2006.01)
(Continued)

(52) U.S. Cl.
CPC ....... *G01N 30/24* (2013.01); *G01N 35/00732* (2013.01); *G01N 35/02* (2013.01);
(Continued)

(58) Field of Classification Search
CPC .................. G01N 35/02; G01N 35/025; G01N 35/00742; G01N 35/00752;
(Continued)

(56) References Cited

U.S. PATENT DOCUMENTS 5,369,713 A    11/1994  Schwartz et al.
5,948,360 A     9/1999  Rao et al.
(Continued)

FOREIGN PATENT DOCUMENTS

AU    2015261711    12/2015
CN     201586636    9/2010
(Continued)

OTHER PUBLICATIONS

Notification of Transmittal of the International Search Report and the Written Opinion of the International Searching Authority, or the Declaration, in corresponding PCT Application No. PCT/US2019/017483 (13 pages) (Apr. 30, 2019).

(Continued)

*Primary Examiner* — Herbert K Roberts
(74) *Attorney, Agent, or Firm* — Myers Bigel, P.A.

(57) ABSTRACT

A gas chromatographic system includes a gas chromatographic (GC) subsystem and an autosampler. The autosampler includes a carrier including a plurality of seats and a plurality of sample holders disposed in respective ones of the seats. Each of the sample holders includes: a container defining a chamber configured to hold a sample; and visible indicium on the container; wherein the container is positioned in its seat such that the visible indicium is visible. The autosampler further includes an optical sensor, a controller, at least one mirror, and a sampling system. The optical sensor is configured to read the visible indicia and to generate an output signal corresponding thereto. The controller is configured to receive the output signal. The at least one mirror is arranged and configured to simultaneously reflect images of the visible indicia of a set of the sample holders in the seats to the optical sensor. The sampling system to configured to extract an analyte from at least one of the sample holders and transfer the extracted analyte to the GC subsystem.

35 Claims, 11 Drawing Sheets

(51) Int. Cl.
*G01N 35/04* (2006.01)
*G01N 30/24* (2006.01)
*G01N 30/02* (2006.01)

(52) U.S. Cl.
CPC ....... *G01N 35/04* (2013.01); *G01N 2030/025* (2013.01); *G01N 2035/00752* (2013.01); *G01N 2035/0441* (2013.01)

(58) Field of Classification Search
CPC ......... G01N 35/0762; G01N 35/00772; G01N 35/00782; G01N 35/0792; G01N 35/00801; G01N 35/00811; G01N 35/008211; G01N 38/00831; G01N 35/00841; G01N 35/00851; G01N 35/00861; G01N 2035/0439; G01N 2035/0441; G01N 2035/0443; G01N 2035/0444; G01N 2035/0446; G01N 30/24; G01N 21/6428; G01N 21/6452; B01L 3/502
See application file for complete search history.

(56) References Cited

U.S. PATENT DOCUMENTS

| | | | |
|---|---|---|---|
| 5,985,215 A * | 11/1999 | Sakazume | G01N 35/026 422/105 |
| 6,167,767 B1 | 1/2001 | Mengel et al. | |
| 6,244,117 B1 | 6/2001 | Mengel et al. | |
| 6,246,642 B1 | 6/2001 | Gardner, Jr. et al. | |
| 6,251,267 B1 | 6/2001 | Allington et al. | |
| 6,272,937 B1 | 8/2001 | Mengel et al. | |
| 6,321,609 B1 | 11/2001 | Mengel et al. | |
| 6,340,588 B1 | 1/2002 | Nova et al. | |
| 6,446,515 B2 | 9/2002 | Cole et al. | |
| 6,465,770 B2 | 10/2002 | Gseller | |
| 6,722,564 B2 | 4/2004 | Creager et al. | |
| 6,871,566 B2 | 3/2005 | Niwayama et al. | |
| 7,662,630 B2 | 2/2010 | Tipler et al. | |
| 7,988,933 B2 | 8/2011 | Vijay et al. | |
| 8,043,561 B2 | 10/2011 | Yamakawa et al. | |
| 8,100,266 B2 | 1/2012 | Lackner et al. | |
| 8,170,271 B2 | 5/2012 | Chen | |
| 8,252,232 B2 | 8/2012 | Neeper et al. | |
| 8,859,289 B2 | 10/2014 | Marty et al. | |
| 8,864,030 B2 | 10/2014 | Ohmae | |
| 9,040,288 B2 | 5/2015 | Handique et al. | |
| 9,057,714 B2 | 6/2015 | Gomm et al. | |
| 9,092,650 B2 | 7/2015 | Pronkine | |
| 9,135,487 B2 | 9/2015 | Itoh | |
| 9,151,770 B2 | 10/2015 | Reuteler | |
| 9,236,236 B2 | 1/2016 | Dewitte et al. | |
| 9,251,393 B2 | 2/2016 | Pollack | |
| 9,446,418 B2 | 9/2016 | Johns et al. | |
| 9,835,640 B2 | 12/2017 | Raicu et al. | |
| 9,910,054 B2 | 3/2018 | Johns | |
| 9,953,820 B2 | 4/2018 | Piper | |
| 10,012,661 B2 | 7/2018 | Pollack | |
| 10,088,460 B2 | 10/2018 | Dewitte et al. | |
| 10,146,973 B2 * | 12/2018 | Hagen | G06K 7/1413 |
| 10,191,072 B2 | 1/2019 | Gomm et al. | |
| 10,247,743 B2 | 4/2019 | Suzuki et al. | |
| 10,274,505 B2 | 4/2019 | Johns et al. | |
| 2002/0074405 A1 | 6/2002 | Hadano et al. | |
| 2008/0041137 A1 | 2/2008 | Tipler et al. | |
| 2008/0121688 A1 | 5/2008 | Harrop | |
| 2010/0113285 A1 * | 5/2010 | Kao | G01N 35/0099 506/7 |
| 2013/0000485 A1 | 1/2013 | Tipler et al. | |
| 2016/0245730 A1 | 8/2016 | Neal | |
| 2017/0269112 A1 | 9/2017 | Gerstel | |
| 2017/0370955 A1 * | 12/2017 | Neeper | G01N 35/00732 |
| 2018/0100868 A1 | 4/2018 | Grimwood et al. | |
| 2018/0106820 A1 | 4/2018 | Okabe et al. | |
| 2018/0239936 A1 | 8/2018 | Kluckner et al. | |
| 2018/0252737 A1 | 9/2018 | Gemperle et al. | |
| 2019/0025263 A1 * | 1/2019 | Tolley | G01N 1/2214 |
| 2019/0041318 A1 | 2/2019 | Wissmann et al. | |
| 2019/0087616 A1 * | 3/2019 | Zver | G06K 7/10722 |
| 2019/0311166 A1 * | 10/2019 | Hagen | G01N 35/026 |

FOREIGN PATENT DOCUMENTS

| | | |
|---|---|---|
| EP | 2921859 | 9/2015 |
| JP | 2005338938 A * | 12/2005 |
| WO | 2014/045057 | 3/2014 |

OTHER PUBLICATIONS

"TurboMatrix Headspace Sampler and HS 40/110 Trap User's Guide" PerkinElmer, Inc. (357 pages) (Feb. 2008).

"Multi-function TD autosampler with internal standard addition Series 2 Ultra Thermal Desorption Autosampler" Markes International (12 pages) (Date unknown but admitted prior art).

"TubeTAG PLUS TM Operator's Manual" Markes International (15 pages) (Oct. 2009).

"TurboMatrix Series Thermal Desorbers User's Guide" PerkinElmer, Inc. (422 pages) (Jan. 2007).

* cited by examiner

AUTOSAMPLERS AND GAS CHROMATOGRAPHIC SYSTEMS AND METHODS INCLUDING SAME

FIELD

The present technology relates to gas chromatography and, more particularly, to samplers for gas chromatographic systems.

BACKGROUND

Gas chromatography is commonly used in analytical chemistry for separating and analyzing compounds of a sample. For example, a gas chromatograph may be used to test the purity of a sample, identify a compound, separate different components of a mixture or to prepare (e.g., purify) compounds from a mixture. Gas chromatography is essentially a physical method of separation in which constituents of a test sample in a carrier gas are adsorbed and desorbed by a stationary phase material in a column. A plug of the sample is injected into a steady flow of carrier gas. Interactions between this stationary phase material and the various components of the sample—which differ based upon differences among partition coefficients of the components—cause the sample to be separated into the respective components. At the end of the column the individual components are more or less separated in time. Detection of the vapors provides a time-scaled pattern which, by calibration or comparison with known samples, indicates the constituents and their concentrations in the test sample.

Typically, the main components of such a system are the column, an injector for introducing the sample into carrier gas and passing the mixture into the column, a device for transferring sample into the injector, a detector at the outer end of the column, gas controls, and a device such as a computer for processing and displaying the output from the detector. An oven may be used to elevate temperature to enable vaporization of components which may include a wide range of volatilities, and to improve the discrimination of constituents.

In some applications, a headspace sampler is used to selectively supply sample components to the column. Solid, liquid or gaseous samples are provided in vials or other containers. The headspace sampler includes an extraction needle and an autosampler. The vials are held in a platter (e.g., a carousel magazine) of the autosampler. The autosampler delivers each vial to a prescribed position in the headspace sampler where the extraction needle is inserted into the vial. A gaseous aliquot of the sample is then extracted from the headspace of the vial through the needle. The extracted aliquot is then delivered to the column, directly or via an intervening trap.

SUMMARY

According to embodiments of the technology, a gas chromatographic system includes a gas chromatographic (GC) subsystem and an autosampler. The autosampler includes a carrier including a plurality of seats and a plurality of sample holders disposed in respective ones of the seats. Each of the sample holders includes: a container defining a chamber configured to hold a sample; and visible indicium on the container; wherein the container is positioned in its seat such that the visible indicium on the respective container is visible. The autosampler further includes an optical sensor, a controller, at least one mirror, and a sampling system. The optical sensor is configured to read the visible indicia and to generate an output signal corresponding thereto. The controller is configured to receive the output signal. The at least one mirror is arranged and configured to simultaneously reflect images of the visible indicia of a set of the sample holders in the seats to the optical sensor. The sampling system to configured to extract an analyte from at least one of the sample holders and transfer the extracted analyte to the GC subsystem.

In some embodiments, the carrier includes an aperture in each seat; each sample holder is positioned in its seat such that its visible indicium is visible through the aperture in its seat; and the at least one mirror simultaneously reflects the images of the visible indicia of the set of the sample holders in the seats from the apertures to the optical sensor.

According to some embodiments, the carrier defines a carrier footprint, and the at least one mirror and the optical sensor are both positioned within the carrier footprint.

In some embodiments, the autosampler is configured to move the carrier relative to the at least one mirror from a first carrier position, wherein the at least one mirror simultaneously reflects images of the visible indicia of a first set of the sample holders in the seats to the optical sensor, to a second carrier position, wherein the at least one mirror simultaneously reflects images of the visible indicia of a second set of the sample holders in the seats to the optical sensor.

In some embodiments, the carrier is a carousel that is a rotatable about a rotation axis, the first carrier position is a first rotational position, the second carrier position is a second rotational position different from the first rotational position, the sample holders of the first set of the sample holders are disposed in a first radially extending row of the seats, and the sample holders of the second set of the sample holders are disposed in a second radially extending row of the seats.

According to some embodiments, the seats of the first radially extending row are not linearly aligned.

In some embodiments, the controller is configured to programmatically and automatically identify each of the visible indicia of the set of the sample holders in the seats.

According to some embodiments, the visible indicia are barcodes. In some embodiments, the visible indicia are two-dimensional barcodes.

According to some embodiments, the containers are vials, and each of the visible indicia is located on an end wall of the corresponding vial.

In some embodiments, the at least one mirror includes a plurality of mirrors. In some embodiments, the mirrors are coplanar. In some embodiments, at least some of the mirrors are oriented at different angles from one another relative to the optical sensor. In some embodiments, the mirrors each have a flat planar reflecting surface.

According to some embodiments, the at least one mirror is a single mirror. In some embodiments, the single mirror has a planar reflecting surface.

In some embodiments, the at least one mirror has a reflecting surface, the optical sensor has a line of sight from the optical sensor to the reflecting surface, the line of sight is substantially horizontal, the at least one mirror is located below the carrier, and a plane of the reflecting surface is disposed at an angle with respect to vertical that is at least 5 degrees greater than or less than 45 degrees.

According to some embodiments, the optical sensor is a barcode scanner having a field of view lateral scan angle in the range of from about 60 to 120 degrees.

In some embodiments, the optical sensor has a prescribed depth of field, and a sum of a distance from the optical sensor to the at least one mirror and a distance from the at least one mirror to the visible indicia is within the depth of field.

In some embodiments, the sampler is a headspace sampler including a heater, and the sampling system includes an extraction mechanism to extract analyte from a headspace of each sample holder and transfer the extracted analyte to the GC subsystem.

According to embodiments of the technology, a method for performing gas chromatographic includes providing a gas chromatographic (GC) subsystem and an autosampler. The GC subsystem includes an inlet. The autosampler includes a carrier, an optical sensor, a controller, and at least one mirror. The carrier includes a plurality of seats. The method includes mounting a plurality of sample holders in respective ones of the seats, each of the sample holders including: a container defining a chamber configured to hold a sample; and visible indicium on the container; wherein the container is positioned in its seat such that the visible indicium is visible. The method further includes: using the at least one mirror, simultaneously reflecting images of the visible indicia of a set of the sample holders in the seats to the optical sensor; using the optical sensor, reading the visible indicia and generating an output signal corresponding thereto to the controller; and extracting an analyte from at least one of the sample holders and transferring the extracted analyte to the GC sub system.

According to embodiments of the technology, an autosampler includes a carrier including a plurality of seats, and a plurality of sample holders disposed in respective ones of the seats. Each of the sample holders includes: a container defining a chamber configured to hold a sample; and visible indicium on the container; wherein the container is positioned in its seat such that the visible indicium is visible. The autosampler further includes: an optical sensor configured to read the visible indicia and to generate an output signal corresponding thereto; a controller configured to receive the output signal; at least one mirror arranged and configured to simultaneously reflect images of the visible indicia of a set of the sample holders in the seats to the optical sensor; and a sampling system to extract an analyte from at least one of the sample holders.

Further features, advantages and details of the present technology will be appreciated by those of ordinary skill in the art from a reading of the figures and the detailed description of the preferred embodiments that follow, such description being merely illustrative of the present technology.

DETAILED DESCRIPTION

Figure 1:
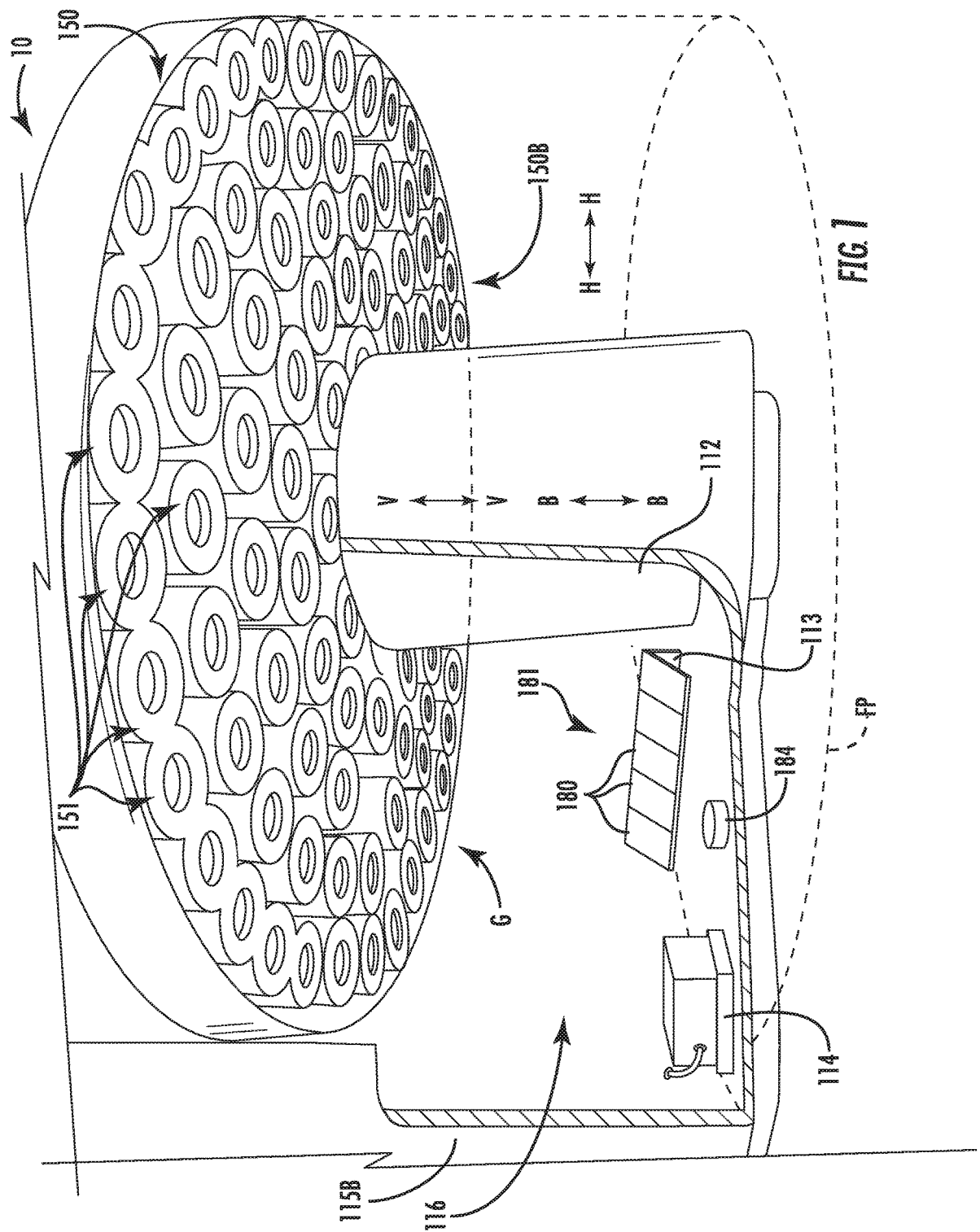
FIG. 1 is a fragmentary, lower left, front perspective view of an autosampler according to embodiments of the technology.
Figure 2:
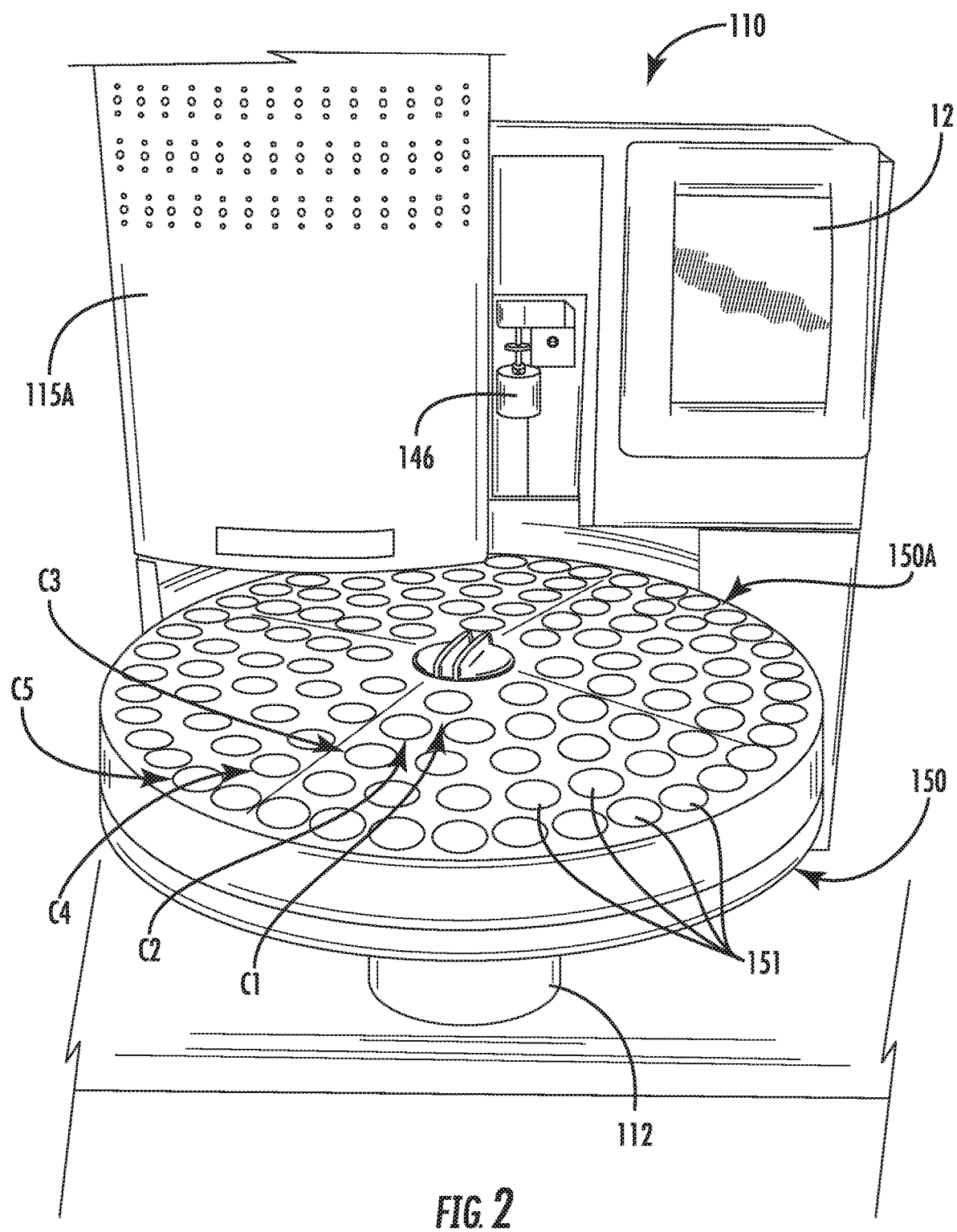
FIG. 2 is a top, front perspective view of the autosampler of FIG. 1.

The present technology now will be described more fully hereinafter with reference to the accompanying drawings, in which illustrative embodiments of the technology are shown. In the drawings, the relative sizes of regions or features may be exaggerated for clarity. This technology may, however, be embodied in many different forms and should not be construed as limited to the embodiments set forth herein; rather, these embodiments are provided so that this disclosure will be thorough and complete, and will fully convey the scope of the technology to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present technology.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

The term "automatically" means that the operation is substantially, and may be entirely, carried out without human or manual input, and can be programmatically directed or carried out.

The term "programmatically" refers to operations directed and/or primarily carried out electronically by computer program modules, code and/or instructions.

The term "electronically" includes both wireless and wired connections between components.

With reference to the figures, a sample analyzer system 10 according to some embodiments of the technology is schematically shown therein. The sample analyzer system 10 includes sample supply system, automated sampler device or autosampler 100, a gas chromatographic (GC) system 20, a controller 50, and a plurality of sample holders 60. The system 10 may include a human-machine interface (HMI) 12 such as a display with a touchscreen.

Figure 3:
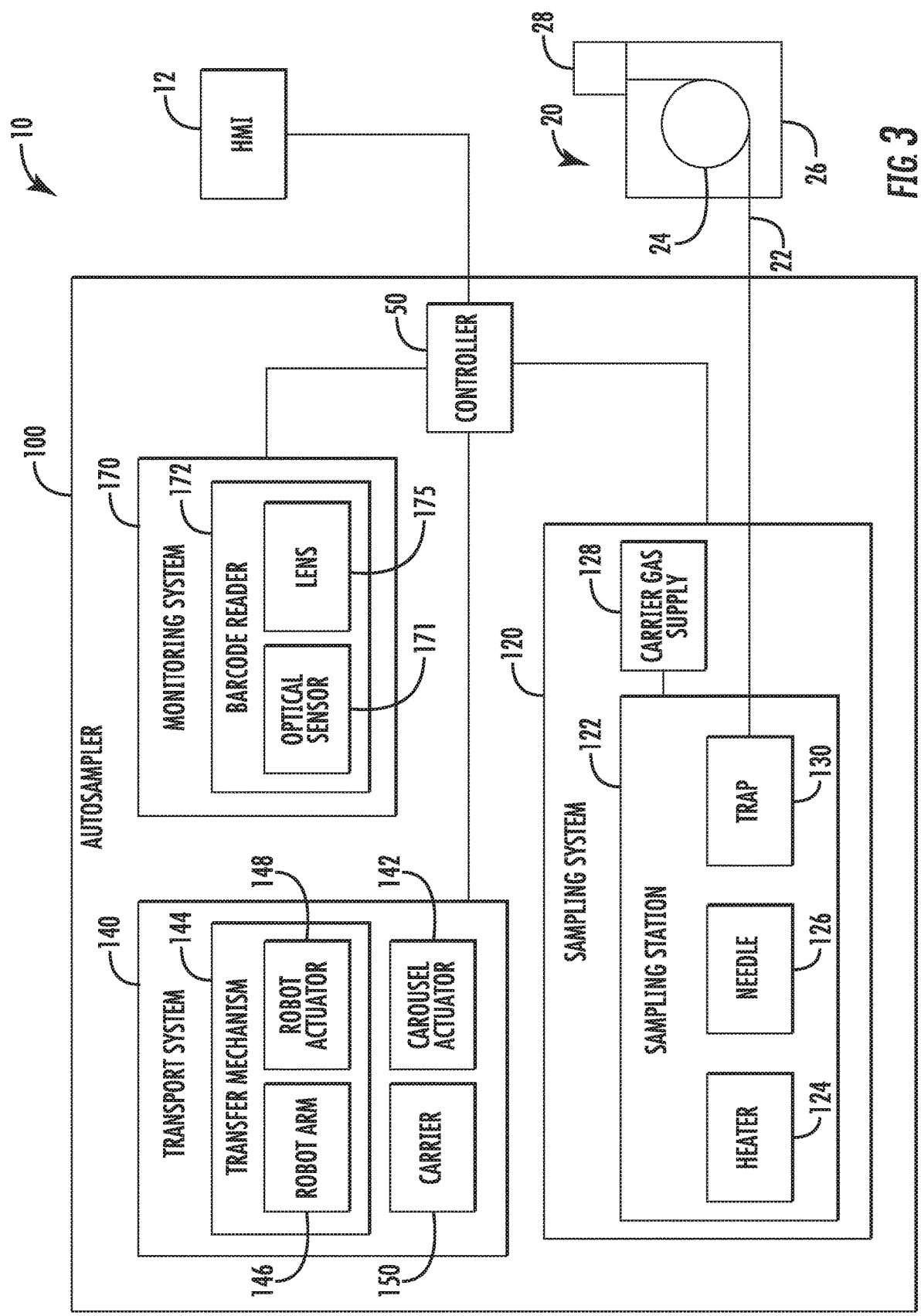
FIG. 3 is a schematic diagram representing a sample analyzer system including the autosampler of FIG. 1.
Figure 4:
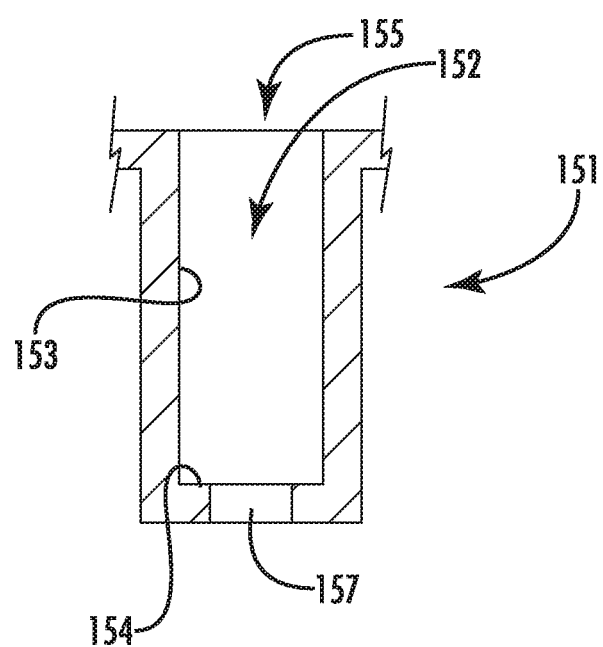
FIG. 4 is a fragmentary, cross-sectional view of a carrier forming a part of the autosampler of FIG. 1.

The GC system 20 may be any suitable GC apparatus. With reference to FIG. 3, an exemplary GC system 20 includes a sample feed line 22, a column 24, a heater or oven 26 and a detector 28. In use, a carrier gas (the mobile phase; e.g., helium or nitrogen) sweeps a sample from the autosampler 100 through the feed line 22 to an inlet of the column 24, and through the column 24 to the detector 28, and thereafter to waste collection, a further detector or other desired destination. The oven 26 selectively heats the column 24 before, during and/or after the sample is passed therethrough in order to control the temperature of the column 24 and the sample. The column 24 includes an inner layer or packing of a selected stationary phase in or on the inner wall of the column 24. The gaseous compounds of the sample interact with the stationary phase; having a different affinity for each component, retains the different components of the sample for different times. As a result, the different compounds elute at different times and take different amounts of time to pass through and exit the column 24 to the detector 28 (i.e., the components have different retention times within the column 24). The detector 28 monitors the outlet stream from the column 24 to detect or sense the time at which each analyte component emerges from the column 24 and reaches the detector 28, and/or the amount of the analyte. The detection data from the detector 28 may be stored and processed by a chromatographic data processing system. Various parameters of the process may be controlled by the controller 50, including the carrier gas flow rate (using a flow controller), the column and/or mobile phase temperatures (using the GC oven 26), and the sample injection timing and rate.

With reference to FIGS. 1-11, the autosampler 100 includes a support frame 110, a sample holder handling or transport system 140, a sample holder monitoring system 170, an extraction or sampling system 120, and a plurality of the sample holders 60.

The frame 110 includes a carousel support 112, a mirror support 113, a barcode reader support 114, an upper housing 115A (FIG. 2), and a lower housing 115B. The frame 110 has a first axis H-H and a perpendicular second axis V-V. In some embodiments and as shown, the axis H-H is a horizontal axis and the axis V-V is a vertical axis.

The sampling system 120 includes a sampling station 122 and a carrier gas supply 128. The sampling station 122 includes a heater 124, an extraction needle 126, and a trap 130. Some or all of these components may be mounted in the housings 115A, 115B.

The heater 124 is positioned to heat a sample holder 60 in the sampling station 122. The heater 124 may be an electrical resistance heater, for example.

The carrier gas may be any suitable gas. The carrier gas may include helium, nitrogen, hydrogen or argon, for example.

The controller 50 may be any suitable device or devices for providing the functionality described herein. The controller 50 may include a plurality of discrete controllers that cooperate and/or independently execute the functions described herein. The controller 50 may include a microprocessor-based computer.

The sample holder transport system 140 includes a transfer mechanism 144 and a sample holder tray, platter, magazine or carrier in the form of a carousel sample carrier 150.

The carrier 150 is mounted on the carousel support 112 for rotation about a rotation axis B-B. A carousel actuator 142 (e.g., one or more electric motors) is provided to drive rotation of the carousel 112 under control of the controller 50, for example.

The carousel carrier 150 has opposing top and bottom sides 150A and 150B. A plurality of sample holder seats 151 (FIG. 4) are provided in the carrier 150. Each seat 151 includes a sidewall 153 and a bottom wall 154 defining a bore, receptacle or slot 152 communicating with a top opening 155. An aperture 157 is defined in each bottom wall 154. Each seat 151 is configured to receive (from above) and releasably hold a respective sample holder 60 for storage and transport.

The seats 151 are arranged in a prescribed configuration. In some embodiments and as shown, the seats 151 are arranged as a series of concentric rings C1-C5. The seats 151 also define a plurality of radially extending rows (i.e., extending radially outwardly from the rotation axis B-B). As discussed below and illustrated, the radially extending rows may be non-uniform, overlapping and/or nonlinear.

The transfer mechanism 144 may include a robot transfer mechanism in the form of a robot transfer arm 146 (FIG. 2) mounted on the frame, and an end effector or gripper mounted on the arm. A robot actuator 148 (e.g., one or more electric motors) is provided to move the arm 146 and the gripper to hold (e.g., grasp) and transport the sample tubes from the carrier 150 to another location under the control of the controller 50, for example.

The sample tube monitoring system 170 includes an optical sensor 171 and a plurality of mirrors 180. The mirrors 180 are arranged as an array 181 of mirrors. The sample tube monitoring system 170 may include a supplemental light source 184 apart from the optical sensor 171.

According to some embodiments, the optical sensor 171 forms a part of a barcode reader 172. The barcode reader 172 has an optical reception window 174. The barcode reader 172 may include a lens 175 that provides the optical sensor 171 with an extended or wide angle field of view. The barcode reader 172 may include an integrated light or laser in addition to or in place of the light source 184.

Figure 6:
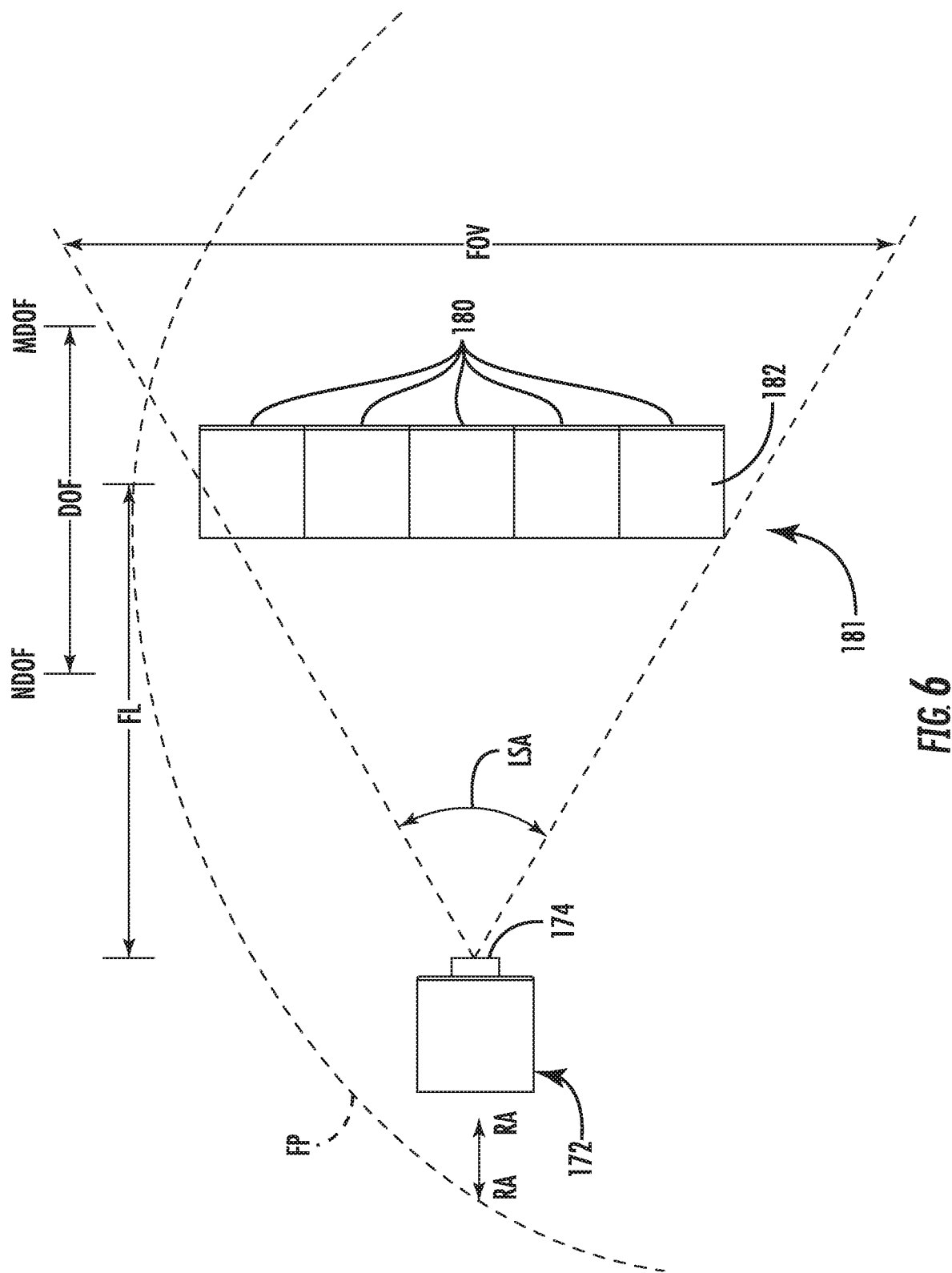
FIG. 6 is a fragmentary, top view of the autosampler of FIG. 1.
Figure 7:
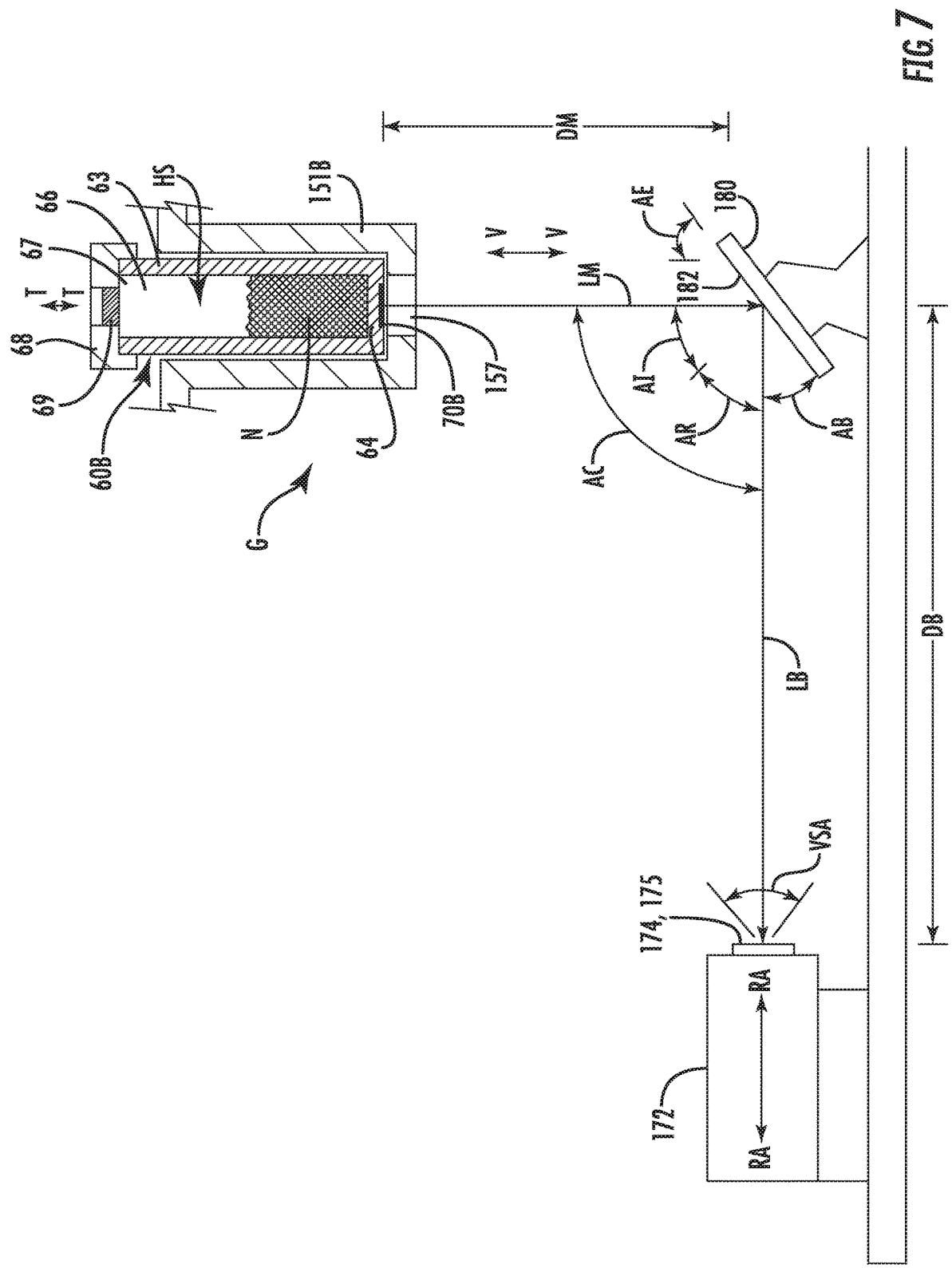
FIG. 7 is a fragmentary, front view of the autosampler of FIG. 1.
Figure 8:
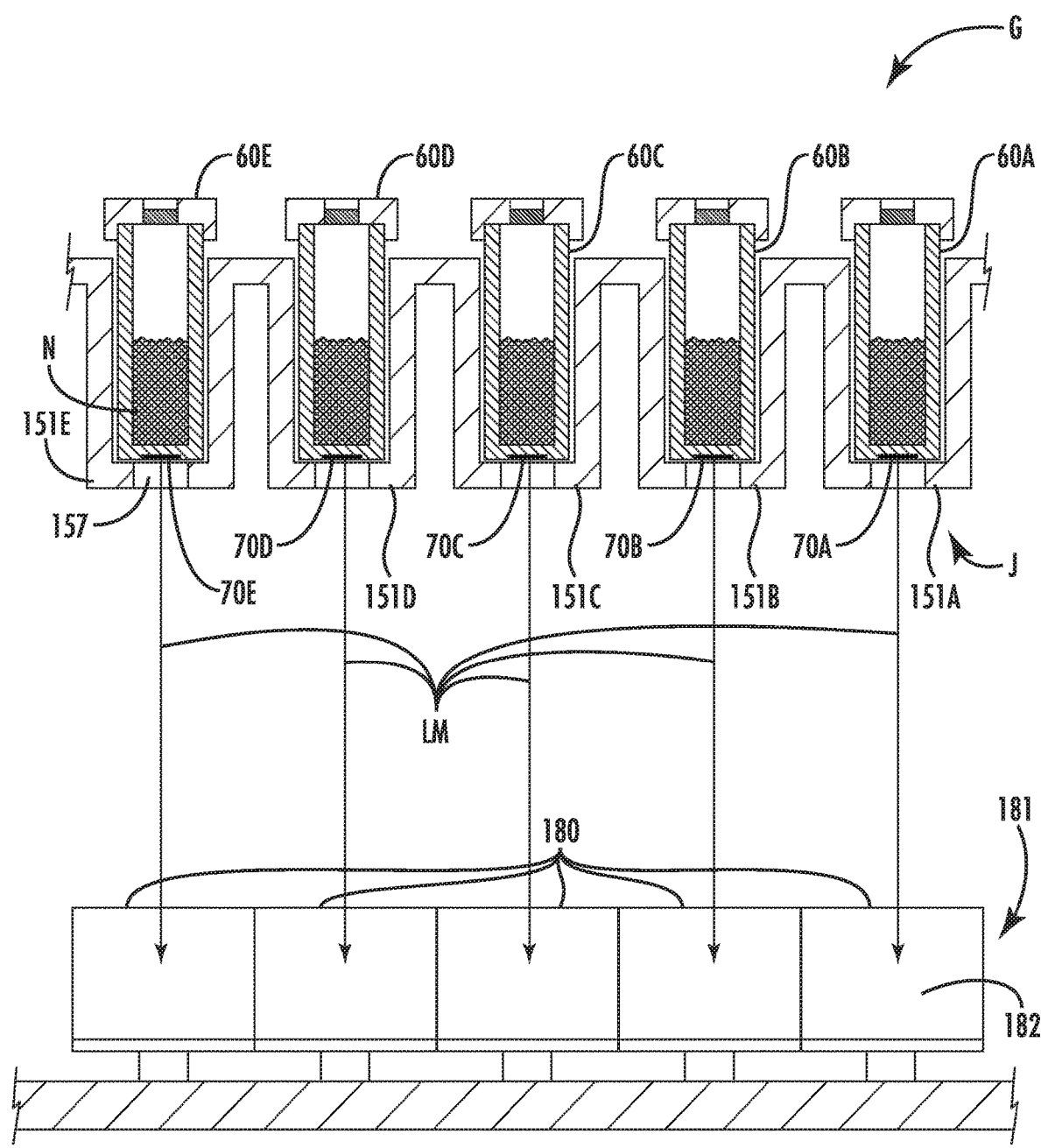
FIG. 8 is a fragmentary, left side view of the autosampler of FIG. 1.

The barcode reader 172 has a reception axis RA (FIGS. 6 and 7). The field of view FOV and focal length FL of the barcode reader 172 are schematically shown in FIG. 6. The lateral scan angle LSA of the barcode reader 172 is schematically shown in FIG. 6. The vertical scan angle VSA of the barcode reader 172 is schematically shown in FIG. 7.

In some embodiments, the barcode reader 172 has a field of view lateral scan angle LSA (FIG. 6) in the range of from about 60 to 120 degrees.

Suitable barcode readers for the optical sensor 171 and barcode reader 172 may include a MicroScan ID20 barcode reader. Other suitable optical sensors for the optical sensor 171 may include a JADAK JE-205 barcode scan engine.

The barcode reader 172 is mounted on the barcode reader support 114. The frame 110 defines a cavity, void or chamber 116 below the carrier 150. In some embodiments, at least the reception window 174 of the barcode reader 172 is disposed beneath the carrier 150 in the vertical outline or footprint FP (FIG. 1) of the carrier 150.

The mirrors 180 are mounted on the mirror support 113. As shown, the apparatus includes five mirrors 180. However, more or fewer mirrors 180 may be provided as desired. Each mirror 180 has a reflecting surface 182.

In some embodiments, the mirrors 180 are flat, planar mirrors.

Figure 5:
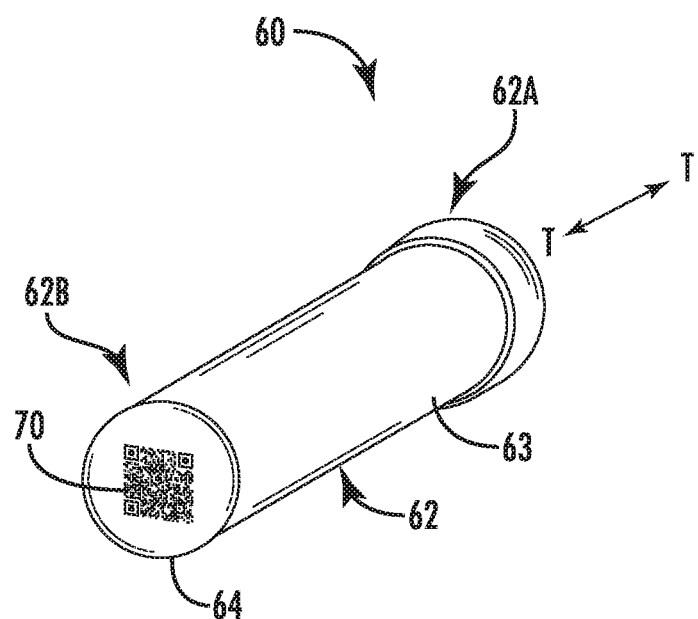
FIG. 5 is a bottom perspective view of a container for use with the autosampler of FIG. 1.

An exemplary one of the sample holders 60 is shown in FIG. 5. The sample holder 60 includes a vessel or container 62 having a sample tube axis T-T. In some embodiments, the container 62 is a cylindrical vial as shown. The container 62 includes a sidewall 63 and an integral bottom end wall 64 at a bottom end 62B. The walls 63, 64 define a containment chamber 66 terminating at an inlet opening 67 at a top end 62A.

The container 62 may be formed of any suitable material(s). In some embodiments, the container 62 is formed of a material selected from the group consisting of steel or glass.

The sample holder 60 further includes an inlet end cap 68 fluidly sealing the opening 67. The end cap 68 may include a penetrable septum 69. The septum 69 may be formed of any suitable material(s). In some embodiments, the septum 69 is formed of a rubber.

The sample holder 60 further includes visible indicium 70 on the end wall 64 of the container 62. The visible indicium 70 may be any suitable computer readable indicium. The visible indicium 70 may be any suitable coded, symbolic or identifying indicium. In some embodiments and as shown in the figures, the visible indicium 70 is a two-dimensional data matrix barcode distributed across the width or diameter of the end wall 64. The indicium 70 may include one or more forms of indicia.

The barcode (or other visible indicium) 70 may be formed of any suitable material(s) and may be secured to the container 62 by any suitable technique. In some embodiments, the barcode 70 is permanently located (i.e., secured or formed) on the container 62. In some embodiments, the barcode 70 is permanently embossed or etched into a surface (e.g., the outer surface) of the container 62. In some embodiments, the barcode 70 is printed (and, in some embodiments, permanently printed) on a surface (e.g., the outer surface) of the container 62. In some embodiments, the barcode 70 is located (e.g., printed) on a separate label component (e.g., a self-adhesive backed label) that is adhered onto a surface (e.g., the outer surface) of the container 62.

The sample analyzer system 10 can be used and operated as follows in accordance with methods of the present technology. The controller 50, the actuator 142, the barcode reader 172, the sampling system 120, and the GC system 20 collectively serve as a control system operative to execute the methods.

One or more sample holders 60 are each mounted in a respective one of the slots 152 of the seats 151 in the carousel carrier 150. Each sample holder 60 and its position in the carousel carrier 150 may be identified and registered or indexed in a sample holder data memory 222 (FIG. 11) associated with the controller 50. Each sample holder 60 has a unique identity that is represented in its barcode 70.

Generally, when it is desired to analyze the sample N in a selected sample holder 60, that sample holder 60 is transported by the robot arm 146 from the carousel carrier 150 to the sampling station 122. The sampling station 122 may include a slot or other seat for holding the sample holder 60 during the following sampling or extraction steps.

The sampling station 122 then heats the sample holder 60 using the heater 124.

The sampling station 122 may also pressurize the chamber 66 of the sample holder 60 by heating and/or with a gas. For example, a needle may be inserted into the chamber 66 through the septum 69 and used to introduce a carrier gas or other pressurizing gas.

The sampling station 122 then inserts the extraction needle 126 through the septum 69 and into a headspace HS of the sample holder 60 (or, if the extraction needle 126 was used to introduce the carrier gas, the extraction needle may be left in place in the headspace HS). The headspace HS is the upper portion of the chamber 66 that is filled with the sample N (and, in some embodiments, a carrier gas) in a gaseous phase. In some embodiments, an amount of the sample N in a liquid or gaseous phase is present in the chamber 66 below the headspace HS. The sampling station 122 then removes or aspirates an aliquot of the gaseous sample N from the headspace HS through the extraction needle 126. The aliquot may be drawn, forced or swept from the sample holder 60 by a pressurized flow of the carrier gas and/or residual pressure in the chamber 66.

The sample/carrier gas mixture is flowed to the trap 130 where the sample is concentrated. From the trap 130, the sample/carrier gas mixture is flowed through the feed line and into the column 24 of the GC system 20. In the GC system 20, the sample is processed as described above. The sample holder 60 may then be returned to the carousel carrier 150 or placed elsewhere.

The handling of the sample holder 60 and the operation of the sample tube monitoring system 170 will now be described in more detail. It will be appreciated that in some embodiments one or more of the steps discussed below may be omitted.

Rotation of the carrier 150 about the axis B-B changes the horizontal position of the seats 151 relative to the mirrors 180. The controller 50 rotates the carousel carrier 150 to position a selected set G (FIGS. 1 and 7-9) of the sample holders 60 at a prescribed reading location. In the reading location, the barcode 70 of each sample holder 60 of the selected set G is in the field of view FOV of the barcode reader 172, as described in more detail below. The barcode reader 172 will read the barcodes 70 and send an output signal corresponding to the barcodes 70 to the controller 50. More particularly, in some embodiments, the barcode reader 172 (including the optical sensor 171) is configured to generate an electrical output signal having voltage levels in a pattern corresponding to the barcodes 70 (visible indicium). The controller 50 is configured to receive and process the output signal. In some embodiments, the output signal represents or embodies image data corresponding to each of the barcodes 70. The output signal will be described hereinbelow with reference to image data; however, in some embodiments, the output signal may represent or embody data other than image data, such as a one dimensional data string.

The controller 50 will process the image data to determine the location of each barcode 70 with respect to the carrier seats 151 and to decrypt the data embodied in the barcode 70. In some embodiments, the controller 50 programmatically and automatically processes the image data to determine said locations and decrypt said data.

The controller 50 will then operate the actuator 142 to rotate the carousel carrier 150 until the set G is properly positioned relative to the sampling station 122. A desired one of the sample holders 60 of the set G is then removed from the carousel carrier 150 and processed to extract and transfer an aliquot of the sample N in the sample holder 60 to the GC system 20 as described above.

Turning to the operation of the autosampler 100 in more detail, the mirrors 180 are positioned to enable the bar code reader 172 to simultaneously receive images of a set of the barcodes 70 in the carrier 150. The mirrors 180 are arranged in a line below the carrier 150. The reception window 174 of the barcode reader 172 is laterally offset from the mirrors 180 a distance DB (FIG. 7). The images of a selected set of the barcodes 70 (i.e., incident light reflected from the images) emanate from the barcodes 70 and through the apertures 157, and are reflected by the mirrors 180 through the reception window 174 onto the optical sensor 171 of the bar code reader 172. The selected set of barcodes 70 to be read can be selectively changed by rotating the carousel carrier 150 to thereby change the positions of the apertures 157 with respect to the mirrors 180.

For example and with reference to FIGS. 1 and 7-9, the system 10 is shown therein with the carrier 150 moved and positioned or indexed in a first position. In this position of the carrier 150, the apertures 157 of five seats 151A-E are positioned directly over (vertically or parallel to the axis V-V) respective ones of the five mirrors 180. The five seats 151A-E constitute a set J of the seats 151 holding a corresponding set G of sample holders 60A-E. The barcodes 70A-E of the sample holders 60A-E are each in the line of sight LM of the respective mirrors 180 through the apertures 157 of their seats 151A-E.

Each mirror 180 is also within a line of sight LB of the barcode reader 172. The reflecting surface 182 of each mirror 180 is disposed at an oblique angle AB with respect to the reception axis RA of the barcode reader 172. Incident light rays emanating from each of the barcodes 70A-E (e.g., ambient light reflected from the visible indicium 70A-E) travel generally along the line of sight LM and are reflected by the corresponding reflecting surface 182 at a reflecting angle AC as reflected rays, which travel generally along the line of sight LB. The reflected rays are directed to the reception window 174. In some embodiments, the reflected rays travel substantially parallel to the reception axis RA of the barcode reader 172. Thus, light from each image of the barcodes 70A-E travels a path through the aperture 157, to the reflecting surface 182, and to the barcode reader 172, where the image is detected by the optical sensor 171 and processed by the barcode reader 172 as described above.

In some embodiments, the angle of incidence AI (FIG. 7) of the incident rays (relative to normal to the reflecting surface 182) is in the range of from about 30 to 60 degrees.

In some embodiments, the angle of reflection AR (FIG. 7) of the reflected rays (relative to normal to the reflecting surface 182) is in the range of from about 30 to 60 degrees.

In some embodiments, the angle AC (FIG. 7) between the incident rays and the reception axis RA is in the range of from about 60 to 120 degrees.

In some embodiments, the barcode reader 172 has a prescribed depth of field DOF extending from a minimum view distance NDOF to a maximum view distance MDOF, and the focal length FL is between the distances NDOF and MDOF (FIG. 6). The sum of the distance DB from the reception window 174 to the mirror reflecting surface 182 and the distance DM from the mirror reflecting surface 182 to the barcode 70A-E is in the depth of field DOF (i.e., the combined distance is in the range between the distance NDOF and the distance MDOF).

In some embodiments, the barcode reader 172 is spaced apart from the mirrors 180 such that all of the reflecting surfaces 182 are located within the field of view FOV of the barcode reader 172.

In some embodiments, each reflecting surface 182 forms an oblique angle AE (FIG. 7) with respect to vertical V-V that is not 45 degrees (i.e., is greater than or less than 45 degrees). In some embodiments, the angle AE is at least 5 degrees greater than or less than 45 degrees. In some embodiments, the angle AE is in the range of from about 5 to 15 degrees greater than or less than 45 degrees. Because the angle AE is significantly offset from 45 degrees, the line of sight of the reflecting surface 182 through the aperture 157 is nonparallel to the vertical axis V-V of the slot 152. As a result, the line of sight LM intersects the sidewall of the slot 152. When a seat 151 is not occupied by a sample holder 60, this configuration can prevent light from an overhead light source from passing directly through the slot opening 155 and aperture 157 and reflecting into the barcode reader 172. Such direct overhead light intrusion could impair the barcode reader's ability to read the barcode 70 in one of the other seats 151.

Figure 10:
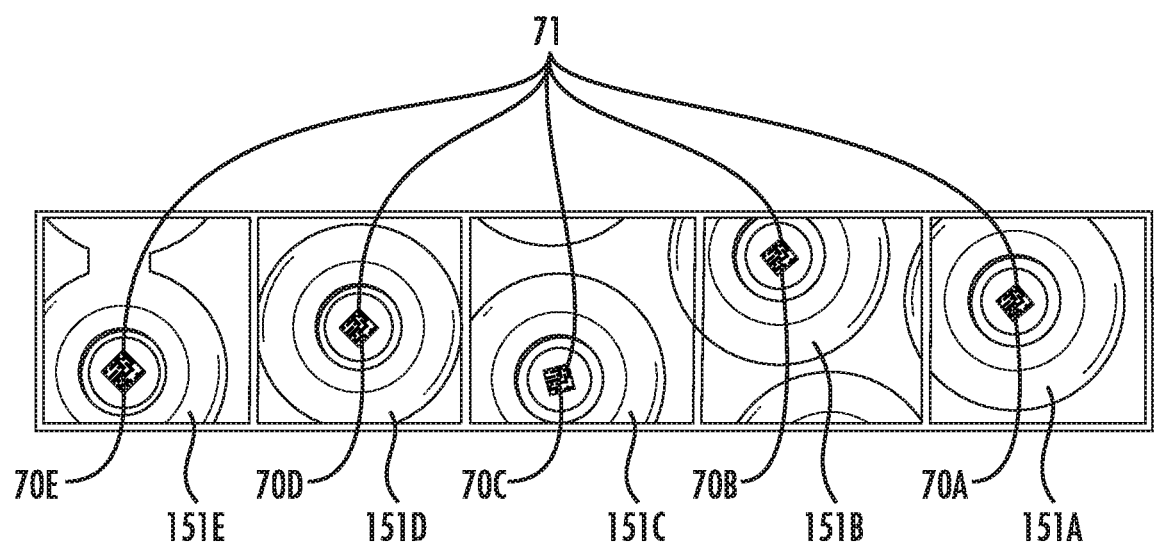
FIG. 10 is a view of a processed image of the seats and barcodes of FIG. 9.

In some embodiments, the controller 50 identifies the corners or other boundaries of the barcodes 70A-E and uses this information to identify which seat 151 each corresponding sample holder 60A-E is disposed in. The controller 50 thereby registers each sample holder 60A-E with a known seat 151 position. For example, FIG. 10 illustrates an image of the carrier 150, seats 151A-E, and barcodes 70A-E as received at the barcode reader 172 and processed by the controller 50. The controller 50 has identified (from the raw image) the corners of each barcode 70A-E and determined the boundaries 71 (e.g., using a fitting technique) and spatial location of each barcode 70A-E relative to the carrier 150. Form this, the controller 50 can determine the seat 151A-E holding each barcode 70A-E (e.g., using carousel data 226 as described below).

The controller 50 decrypts each barcode 70A-E so that the data contained therein is associated with the sample holder 60A-E in the known position and can thereafter be associated with the sample holder and the sample throughout the procedure.

The carrier 150 can then be rotated about the axis B-B to reposition a new, second set of the seats 151 over the mirrors 180. The barcodes 70 of a selected second set of sample holders 60 are thereby exposed to the mirrors 180 through their apertures 157, and reflected by the mirrors 180 through the reception window 174 onto the optical sensor 171 of the barcode reader 172.

For example, the carrier 150 can be rotated so that a second set K of seats 151A and 151F-I are positioned over the mirrors 180. Images of the barcodes 70 of sample holders 60 in those seats 151A and 151F-I are then simultaneously reflected by the mirrors 180 to the barcode reader 172 and read by the barcode reader 172 as described above.

It will be appreciated that in some cases one of more of the seats 151 aligned with and reflected to the barcode reader 172 may be empty of a sample holder 60.

Figure 9:
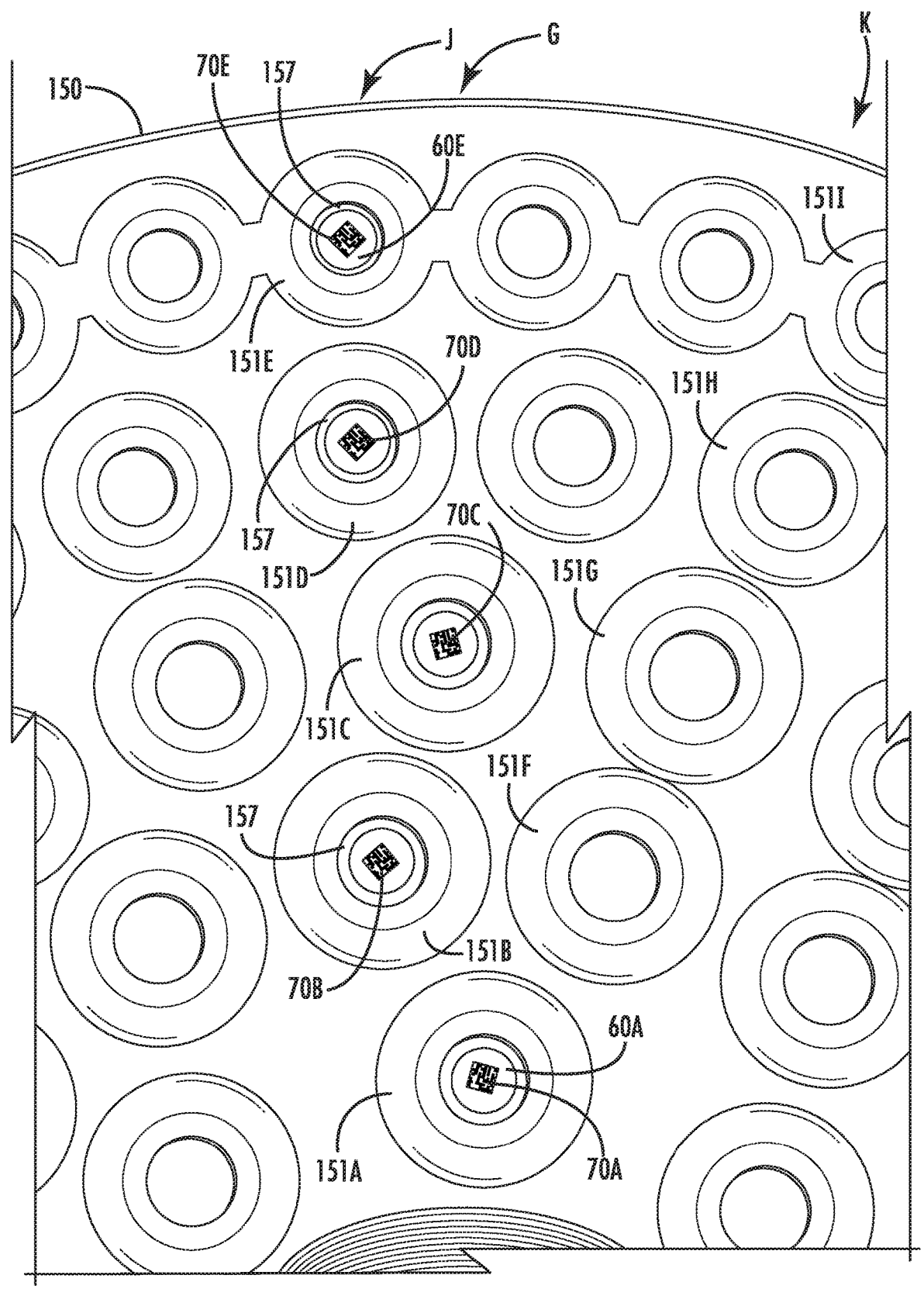
FIG. 9 is a fragmentary, bottom view of the autosampler of FIG. 1 showing a set of seats in the carrier and a set of barcodes to be read therein.

The size and spatial arrangement of the seats 151 of each reflected set may vary. For example, the seats 151 of a set may be arranged in a radially extending row of seats 151A-E as shown in FIG. 9. The seats 157A-E of the row may be nonlinearly aligned (e.g., as shown in FIG. 9). The seats of another set, aligned with the mirrors 180 in a different rotational position of the carrier 150, may include fewer (or more) than five seats 151. Some seats 151 may be visible in more than one rotational position of the carrier 150. The controller 50 may be configured to identify the locations of each read sample holder 60 as discussed above, regardless of the size or spatial layout of its set or whether it is present in more than one read set.

The sample analyzer system 10 and, in particular, the sample tube monitoring system 170, can read the visible indicium 70 in each seat 151 of the carrier even though the seats 151 are spatially distributed. The monitoring system 170 can simultaneously read a set of the sample holders 60, which can provide more efficient and reliable operation. The monitoring system 170 can accomplish this with a stationary barcode reader 172. It is only necessary to move the carrier 150 to selectively reposition the seats 151 relative to the mirrors 180.

The sample analyzer system 10 can accomplish the foregoing while maintaining a relatively compact form factor. The use of the mirrors 180 permits the barcode reader 172 to be placed laterally closer to the location at which sample holders are positioned during reading (and even under the carrier 150 as shown) while retaining an effective viewing distance between the barcode reader 172 and the visible indicia 70 that is within the depth of field of the bar code reader 172.

In some embodiments, the reflecting surfaces 182 may be angled differently with respect to one another. Different mirror angles may be used to provide better lines of sight between mirrors at different positions and the bar code reader.

In some embodiments, the monitoring system uses fewer than one mirror per seat to be read. In some embodiments, the five mirrors 180 are replaced with a single larger mirror.

Operations described herein can be executed by or through the controller 50. The actuators 142 and other devices of the system 10 can be electronically controlled. According to some embodiments, the controller 50 programmatically executes some, and in some embodiments all, of the steps described. According to some embodiments, the movements of the actuators are fully automatically and programmatically executed by the controller 50.

In some embodiments, the controller 50 programmatically and automatically executes each of the steps of reading the barcodes 70, processing the image data to determine the locations and data contents of the barcodes 70, and transporting the sample holders 60 from the carousel carrier 150 to the sampling station 122. In some embodiments, the controller 50 programmatically and automatically executes each of the steps of operation of the autosampler device 100 described above.

Embodiments of the controller 50 logic may take the form of an entirely software embodiment or an embodiment combining software and hardware aspects, all generally referred to herein as a "circuit" or "module." In some embodiments, the circuits include both software and hardware and the software is configured to work with specific hardware with known physical attributes and/or configurations. Furthermore, controller logic may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or other storage devices.

Figure 11:
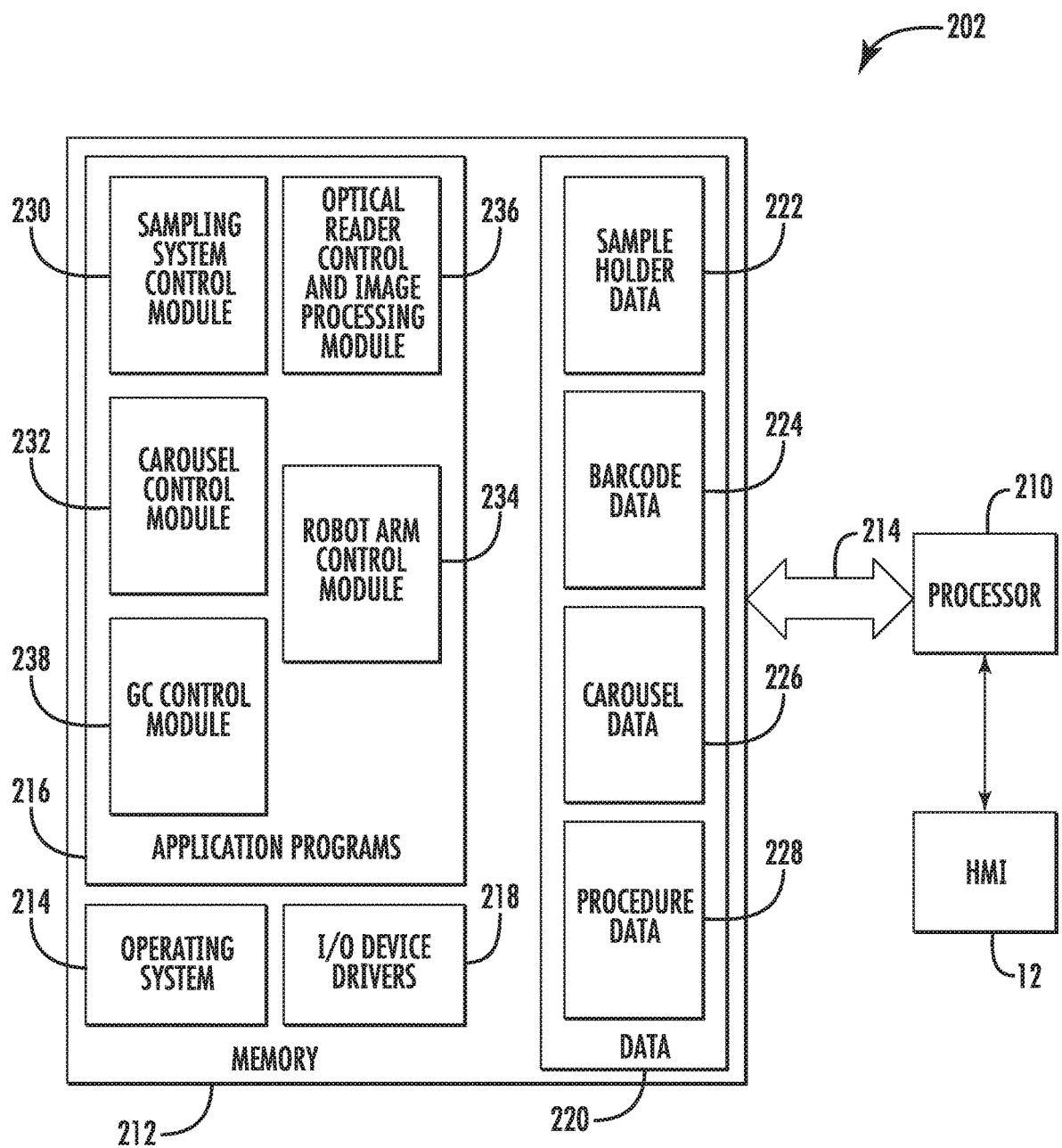
FIG. 11 is a schematic diagram representing a controller forming a part of the sample analyzer system of FIG. 3.

FIG. 11 is a schematic illustration of a circuit or data processing system 202 that can be used in the controller 50. The circuits and/or data processing systems may be incorporated in a digital signal processor 210 in any suitable device or devices. The processor 210 communicates with the HMI 12 and memory 212 via an address/data bus 214. The processor 210 can be any commercially available or custom microprocessor. The memory 212 is representative of the overall hierarchy of memory devices containing the software and data used to implement the functionality of the data processing system. The memory 212 can include, but is not limited to, the following types of devices: cache, ROM, PROM, EPROM, EEPROM, flash memory, SRAM, and DRAM.

FIG. 11 illustrates that the memory 212 may include several categories of software and data used in the data processing system: the operating system 214; the application programs 216; the input/output (I/O) device drivers 218; and data 220.

The data 220 can include equipment-specific data. FIG. 11 also illustrates that the data 220 can include sample holder data 222, barcode data 224, carousel data 226, and procedure data 228. The sample holder data 222 can include data relating to or representing characteristics of each sample holder 60, including a unique identifier (e.g., serial number), name, and description of an analyte contained in the sample holder 60, for example. The barcode data 224 can include a registry indexing or cross-referencing barcodes to the serial numbers of the sample holders 60, for example. The carousel data 226 can include seat location data representing spatial or geometric layout or positions of the seats 151 relative to the carrier 50 and the frame 110. The procedure data 228 can include data representing a protocol or sequence of steps to execute the procedures described herein (including an analytical sequence, for example).

FIG. 11 also illustrates that application programs 216 can include a sampling system control module 230 (to control the sampling system 120), a carousel control module 232 (to control the actuator 142), a robot arm control module 234 (to control the actuator 148), an optical reader control and image processing module 236 (to control the sample tube monitoring system 170 (including the optical sensor 171)), and a GC control module 238 to control the GC system 20.

As will be appreciated by those of skill in the art, the operating system 214 may be any operating system suitable for use with a data processing system. The I/O device drivers 218 typically include software routines accessed through the operating system 214 by the application programs 216 to communicate with devices such as I/O data port(s), data storage and certain memory components. The application programs 216 are illustrative of the programs that implement the various features of the data processing system and can include at least one application, which supports operations according to embodiments of the present technology. Finally, the data 220 represents the static and dynamic data used by the application programs 216, the operating system 214, the I/O device drivers 218, and other software programs that may reside in the memory 212.

As will be appreciated by those of skill in the art, other configurations may also be utilized while still benefiting from the teachings of the present technology. For example, one or more of the modules may be incorporated into the operating system, the I/O device drivers or other such logical division of the data processing system. Thus, the present technology should not be construed as limited to the configuration of FIG. 11, which is intended to encompass any configuration capable of carrying out the operations described herein. Further, one or more of the modules can communicate with or be incorporated totally or partially in other components, such as the controller 50.

In accordance with some embodiments of the technology, an autosampler as described herein includes a circular carousel that is rotated to bring sample containers into a sampling position selected from a plurality of available sampling positions. The sample containers are arranged as concentric rings and a robot arm is used to pick out sample containers from the different rings. The indicia reader is physically fixed below the carousel and, in some embodiments, is a single image-based bar code reader. To enable containers in all rings to be read as the carousel rotates, multiple mirrors are used to focus multiple images of the indicia on multiple containers on the single image-based bar code reader. Software forming a part of the system is able to and does process the images to extract the respective indicium from each and every container on the carousel. The system thus uses a single and fixed barcode image reader to read indicia on multiple sample containers in different locations by using multiple mirrors to focus multiple images on the single barcode reader. In some embodiments, the single mirror is used in place of the multiple mirrors.

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims, therefore, are to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

What is claimed:

1. A gas chromatographic system comprising:
   a gas chromatographic (GC) subsystem; and
   an autosampler including:
      a carrier including a plurality of seats;
      a plurality of sample holders disposed in respective ones of the seats, each of the sample holders including:
         a container defining a chamber configured to hold a sample; and
         visible indicium on the container;
         wherein the container is positioned in its seat such that the visible indicium is visible;
      an optical sensor configured to read the visible indicia and to generate an output signal corresponding thereto;
      a controller configured to receive the output signal; and
      at least one mirror arranged and configured to simultaneously reflect images of the visible indicia of a set of the sample holders in the seats to the optical sensor; and
      a sampling system to extract an analyte from at least one of the sample holders and transfer the extracted analyte to the GC subsystem.

2. The gas chromatographic system of claim 1 wherein:
   the carrier includes an aperture in each seat;
   each sample holder is positioned in its seat such that its visible indicium is visible through the aperture in its seat; and
   the at least one mirror simultaneously reflects the images of the visible indicia of the set of the sample holders in the seats from the apertures to the optical sensor.

3. The gas chromatographic system of claim 1 wherein:
   the carrier defines a carrier footprint; and
   the at least one mirror and the optical sensor are both positioned within the carrier footprint.

4. The gas chromatographic system of claim 1 wherein the autosampler is configured to move the carrier relative to the at least one mirror from a first carrier position, wherein the at least one mirror simultaneously reflects images of the visible indicia of a first set of the sample holders in the seats to the optical sensor, to a second carrier position, wherein the at least one mirror simultaneously reflects images of the visible indicia of a second set of the sample holders in the seats to the optical sensor.

5. The gas chromatographic system of claim 4 wherein:
   the carrier is a carousel that is a rotatable about a rotation axis;
   the first carrier position is a first rotational position;
   the second carrier position is a second rotational position different from the first rotational position;
   the sample holders of the first set of the sample holders are disposed in a first radially extending row of the seats; and
   the sample holders of the second set of the sample holders are disposed in a second radially extending row of the seats.

6. The gas chromatographic system of claim 5 wherein the seats of the first radially extending row are not linearly aligned.

7. The gas chromatographic system of claim 1 wherein the controller is configured to programmatically and automatically identify each of the visible indicia of the set of the sample holders in the seats.

8. The gas chromatographic system of claim 1 wherein the visible indicia are barcodes.

9. The gas chromatographic system of claim 8 wherein the visible indicia are two-dimensional barcodes.

10. The gas chromatographic system of claim 1 wherein:
    the containers are vials; and
    each of the visible indicia is located on an end wall of the corresponding vial.

11. The gas chromatographic system of claim 1 wherein the at least one mirror includes a plurality of mirrors.

12. The gas chromatographic system of claim 11 wherein the mirrors are coplanar.

13. The gas chromatographic system of claim 11 wherein at least some of the mirrors are oriented at different angles from one another relative to the optical sensor.

14. The gas chromatographic system of claim 11 wherein the mirrors each have a flat planar reflecting surface.

15. The gas chromatographic system of claim 1 wherein the at least one mirror is a single mirror.

16. The gas chromatographic system of claim 15 wherein the single mirror has a planar reflecting surface.

17. The gas chromatographic system of claim 1 wherein:
    the at least one mirror has a reflecting surface;
    the optical sensor has a line of sight from the optical sensor to the reflecting surface;
    the line of sight is substantially horizontal;
    the at least one mirror is located below the carrier; and
    a plane of the reflecting surface is disposed at an angle with respect to vertical that is at least 5 degrees greater than or less than 45 degrees.

18. The gas chromatographic system of claim 1 wherein the optical sensor is a barcode scanner having a field of view lateral scan angle in the range of from about 60 to 120 degrees.

19. The gas chromatographic system of claim 1 wherein:
the optical sensor has a prescribed depth of field; and
a sum of a distance from the optical sensor to the at least one mirror and a distance from the at least one mirror to the visible indicia is within the depth of field.

20. The gas chromatographic system of claim 1 wherein:
the autosampler is a headspace sampler including a heater; and
the sampling system includes an extraction mechanism to extract analyte from a headspace of each sample holder and transfer the extracted analyte to the GC subsystem.

21. A method for performing gas chromatography, the method comprising:
providing a gas chromatographic (GC) subsystem including an inlet;
providing an autosampler including:
a carrier including a plurality of seats; and
an optical sensor;
a controller; and
at least one mirror;
mounting a plurality of sample holders in respective ones of the seats, each of the sample holders including:
a container defining a chamber configured to hold a sample; and
visible indicium on the container;
wherein the container is positioned in its seat such that the visible indicium is visible;
using the at least one mirror, simultaneously reflecting images of the visible indicia of a set of the sample holders in the seats to the optical sensor;
using the optical sensor, reading the visible indicia and generating an output signal corresponding thereto to the controller; and
extracting an analyte from at least one of the sample holders and transferring the extracted analyte to the GC subsystem.

22. An autosampler comprising:
a carrier including a plurality of seats;
a plurality of sample holders disposed in respective ones of the seats, each of the sample holders including:
a container defining a chamber configured to hold a sample; and
visible indicium on the container;
wherein the container is positioned in its seat such that the visible indicium is visible;
an optical sensor configured to read the visible indicia and to generate an output signal corresponding thereto;
a controller configured to receive the output signal;
at least one mirror arranged and configured to simultaneously reflect images of the visible indicia of a set of the sample holders in the seats to the optical sensor; and
a sampling system to extract an analyte from at least one of the sample holders.

23. The autosampler of claim 22 wherein:
the carrier includes an aperture in each seat;
each sample holder is positioned in its seat such that its visible indicium is visible through the aperture in its seat; and
the at least one mirror simultaneously reflects the images of the visible indicia of the set of the sample holders in the seats from the apertures to the optical sensor.

24. The autosampler of claim 22 wherein:
the carrier defines a carrier footprint; and
the at least one mirror and the optical sensor are both positioned within the carrier footprint.

25. The autosampler of claim 22 wherein the autosampler is configured to move the carrier relative to the at least one mirror from a first carrier position, wherein the at least one mirror simultaneously reflects images of the visible indicia of a first set of the sample holders in the seats to the optical sensor, to a second carrier position, wherein the at least one mirror simultaneously reflects images of the visible indicia of a second set of the sample holders in the seats to the optical sensor.

26. The autosampler of claim 25 wherein:
the carrier is a carousel that is a rotatable about a rotation axis;
the first carrier position is a first rotational position;
the second carrier position is a second rotational position different from the first rotational position;
the sample holders of the first set of the sample holders are disposed in a first radially extending row of the seats; and
the sample holders of the second set of the sample holders are disposed in a second radially extending row of the seats.

27. The autosampler of claim 26 wherein the seats of the first radially extending row are not linearly aligned.

28. The autosampler of claim 22 wherein the controller is configured to programmatically and automatically identify each of the visible indicia of the set of the sample holders in the seats.

29. The autosampler of claim 22 wherein the visible indicia are barcodes.

30. The autosampler of claim 29 wherein the visible indicia are two-dimensional barcodes.

31. The autosampler of claim 22 wherein the at least one mirror includes a plurality of mirrors.

32. The autosampler of claim 31 wherein at least some of the mirrors are oriented at different angles from one another relative to the optical sensor.

33. The autosampler of claim 22 wherein:
the at least one mirror has a reflecting surface;
the optical sensor has a line of sight from the optical sensor to the reflecting surface;
the line of sight is substantially horizontal;
the at least one mirror is located below the carrier; and
a plane of the reflecting surface is disposed at an angle with respect to vertical that is at least 5 degrees greater than or less than 45 degrees.

34. The autosampler of claim 22 wherein the optical sensor is a barcode scanner having a field of view lateral scan angle of from about 60 to 120 degrees.

35. The autosampler of claim 22 wherein:
the optical sensor has a prescribed depth of field; and
a sum of a distance from the optical sensor to the at least one mirror and a distance from the at least one mirror to the visible indicia is within the depth of field.

* * * * *